United States Patent [19]
Szabo

[11] Patent Number: 5,102,313
[45] Date of Patent: Apr. 7, 1992

[54] COUPLER PARTICULARLY SUITABLE FOR USE AS A FUEL SENDER COUPLING DEVICE

[75] Inventor: George Szabo, Ortonville, Mich.

[73] Assignee: Alfred Teves GmbH, Frankfurt am Main, Fed. Rep. of Germany

[21] Appl. No.: 614,354

[22] Filed: Nov. 16, 1990

[51] Int. Cl.$^5$ .............................................. F04B 39/14
[52] U.S. Cl. ..................................... 417/572; 417/363; 285/305
[58] Field of Search ..................... 417/572, 363; 285/4, 285/305, 363

[56] References Cited

U.S. PATENT DOCUMENTS

| | | | |
|---|---|---|---|
| 3,245,702 | 8/1965 | Smith | 285/305 |
| 3,794,057 | 2/1974 | Badger | 285/4 |
| 4,433,861 | 2/1984 | Kreczik | 285/305 |
| 4,569,637 | 2/1986 | Tuckey | 417/363 |
| 4,869,534 | 9/1989 | Ketcham et al. | 285/305 |

Primary Examiner—Richard A. Bertsch
Assistant Examiner—Charles Freay
Attorney, Agent, or Firm—Robert P. Seitter; J. Gordon Lewis

[57] ABSTRACT

A coupler for connecting the confronting ends of two fluid lines. The coupler includes a coupler housing having a generally tubular body extending along a longitudinal axis. The body includes an opening at a first end thereof for receiving a first tube in the body and an opening at a second end thereof for receiving a second tube in the body. Seals are provided for sealing engaging an end portion of the first tube within the body and for sealingly engaging an end portion of the second tube within the body. A clip extends radially inwardly from a slot in the body for engaging the first tube to retain the first tube within the body and to limit the longitudinal movement of the first tube into the body. The body includes a frangible neck portion intermediate the openings at the ends of the body for separating the first and second tubes by shearing the body at its neck portion.

13 Claims, 1 Drawing Sheet

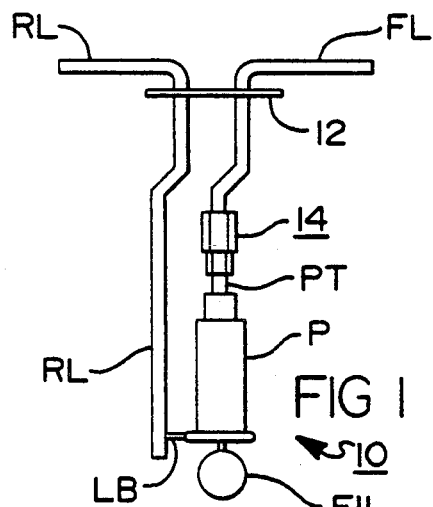
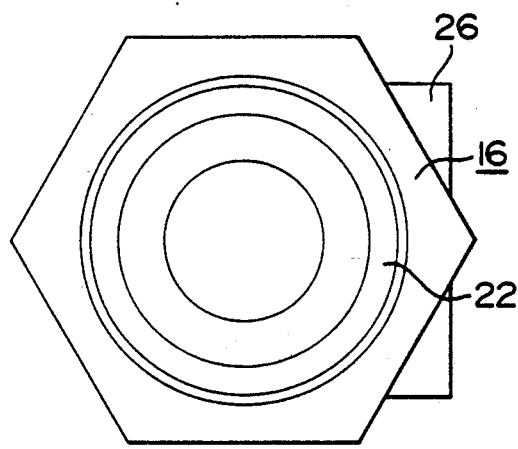
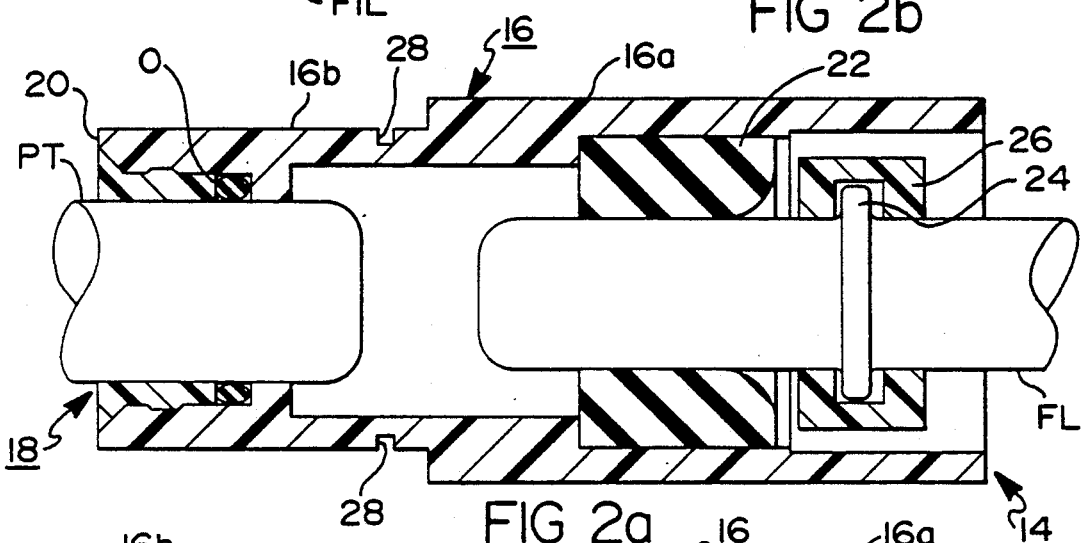
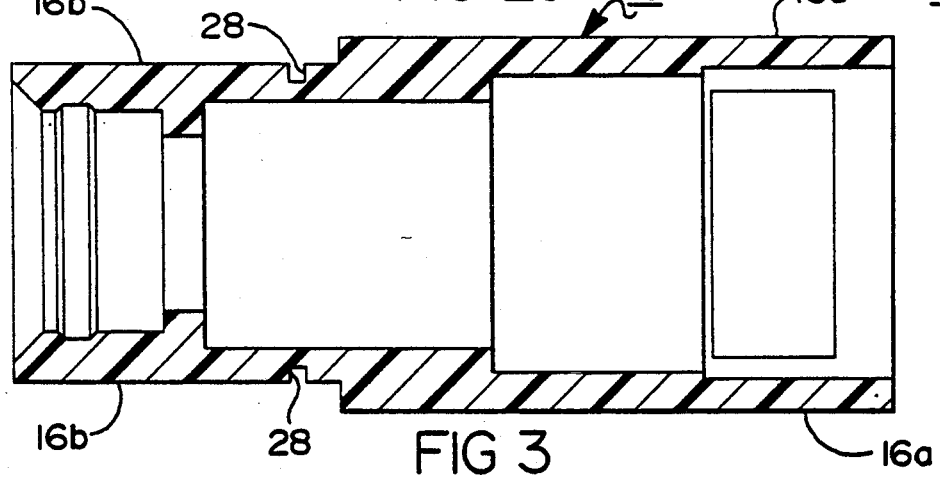
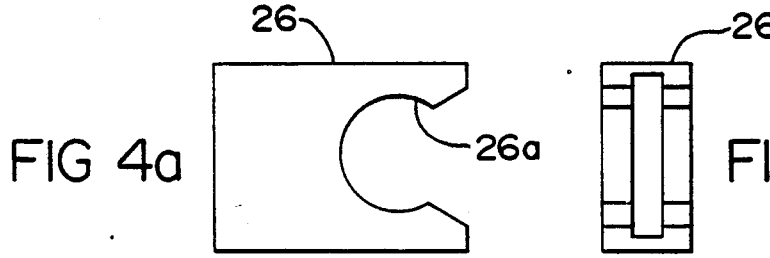
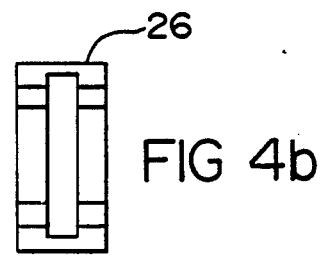

COUPLER PARTICULARLY SUITABLE FOR USE AS A FUEL SENDER COUPLING DEVICE

BACKGROUND OF THE INVENTION

This invention relates to a coupler for connecting the confronting ends of two fluid lines, and, more particularly, to a coupler which is suitable for use in connecting the fuel sender assembly of an automotive vehicle to the vehicle fuel line.

Fuel line senders for vehicle fuel lines are known and have been widely used in the art. These senders typically are provided in the gasoline vessel of an automotive vehicle and are utilized to provide pressure to advance the gasoline fluid contained therein to the engine by way of a fuel line. The fuel sender typically is mounted within the gasoline containing vessel, such as a gas tank, and is connected to the external fuel line by way of an intermediate rubber hose. The rubber hose is fastened to the delivery fuel line and the fuel pump by way of hose clamps and other similar devices. This configuration has suffered the disadvantage that the pump and associated devices are difficult to replace or repair because of the manual effort and manipulation required to remove the interconnecting hose and the associated fastening devices.

These and other disadvantages are overcome by the present invention wherein a connector is provided for connecting the fuel line to the pump device within the fuel vessel which permits ready access to the pump and related devices for installation and servicing requirements. These disadvantages are overcome wherein a connector is provided between the pump and the fuel line which readily can be disassembled, particularly during servicing.

SUMMARY OF THE INVENTION

Briefly, a coupler is provided for connecting the confronting ends of two fluid lines The coupler comprises a coupler housing having a generally tubular body extending along a longitudinal axis. The body includes an opening at a first end thereof for receiving a first tube in the body and includes an opening at a second end thereof for receiving a second tube in the body. Means are provided for sealingly engaging an end portion of the first tube within the body and means are similarly provided for sealingly engaging an end portion of the second tube within the body. A clip which extends radially inwardly from a slot in the body is provided for engaging the first tube to retain the first tube within the body to limit the longitudinal movement of the first tube into the body.

BRIEF DESCRIPTION OF THE DRAWINGS

The advantages of this invention will become more readily appreciated as the same becomes completely understood by reference to the following detailed description when taken in conjunction with the accompanying drawing wherein:

FIG. 1, is a perspective view of a typical fuel sender installation including a coupler in accordance with the principles of the present invention;

FIG. 2a, is a cross-sectional view of the coupler in accordance with the present invention;

FIG. 2b, is an end view of the coupler of FIG. 2a illustrating the hexagonal cross-sectional configuration of the coupler;

FIG. 3, is a cross-sectional view of the coupler housing of FIGS. 2a and 2b; and, FIGS. 4a and 4b, respectively, illustrate plan and end views of the clip device employed in the coupler of the previous drawing FIGURES in accordance with the principles of the present invention.

DETAILED DESCRIPTION

FIG. 1 illustrates generally at 10 a typical fuel sender installation of a fuel pump P which is inserted into a fuel vessel such as a gasoline tank. Sender 10 includes a fuel output line FL and a return line RL. Fuel sender 10 includes a mounting flange 12 which is typically provided in the form of a locking ring which engages an interconnecting surface of the fuel vessel. Return line RL receives residual fuel from the automotive vehicle system and returns same into the lower portion of the surrounding fuel vessel. The input of pump P is provided with a suitable filter FIL which screens the pump input in known manner. The output of pump P is coupled to the fuel line FL by way of a coupler 14 in accordance with the teachings of the present invention. Coupler 14 releasably engages the upper portion or pump output tube PT of pump P and further releasably engages the input to fuel line FL at the upper end of coupler 14. Coupler 14 is engageable with the confronting ends of output tube PT of pump P and fluid line FL by way of seals provided within coupler 14. For removal of pump P or any other component of the fuel sender system, coupler 14 can be separated from its connection by means of a frangible neck portion provided along a stepped intermediate portion of coupler 14 as will be described in more detail hereinafter.

Referring now to FIGS. 2a and 2b there are shown a plan, cross-sectional view and an end view of coupler 14 respectively of the coupler device in accordance with FIG. 1. It can be seen that coupler 14 includes a body 16 having a first end 18 for receiving the pump tube PT. Pump tube PT is received within the first end 18 of coupler 14 and is sealingly engaged therein by way of an O-ring O. A first member 20 is provided at the opening of first end 18 so as to provide a bearing surface to receive pump tube PT and to provide a retaining wall or backstop for O-ring O as is illustrated in FIG. 2a. The other end of housing 16 receives fuel line FL therein which sealingly engages a generally annular donut seal 22 in a sealing relationship therewith. Fuel line FL includes a bead portion 24 as is well known in the art. Bead portion 24 engages a clip 26 which is inserted through a slot provided in at least one radially facing wall of housing 16. As is illustrated more clearly in FIGS. 4a and 4b, clip 26 snaps over the circular surface of fluid line FL so as to retain fluid line FL within housing 16. Housing 16 includes a stepped portion defined by the portions 16a and 16b which are of differing radial dimension. Portion 16b is provided with a neck portion 28 which is provided so as to facilitate separation of the connector for removal of pump P or an associated system component such as during servicing operation. That is, neck portion 28 provides a frangible portion 28 which permits breaking and separating the connector during a servicing operation. In this regard, and as illustrated more clearly in FIG. 2b, the step portions of housing 16 are provided in a hexagonal cross-sectional configuration so as to permit or facilitate application of suitable torque tool or tools so as to accomplish the separation procedure wherein frangible portion 28 separates the housing portions during the removal operation.

Referring now to FIG. 3 there is shown a cross-sectional view of housing 16 which illustrates neck portion 28 and the configuration and internal details of the respective housing portions.

Referring now to FIGS. 4a and 4b there are shown plan and end views of the clip 26 of FIGS. 2a and 2b. It can be seen by reference to FIG. 4a that the clip 26 includes a key way portion 26a which engages and clamps and snaps over the outside circumference of fluid line tube FL.

It has been found that the coupler device in accordance with the principles of the present invention facilitates removal of the fluid sender assembly in-that the assembly can be removed or serviced by separating the fuel line from the pump P by applying torque tools to the stepped body configuration of body 16 break body 16 at neck portion 28 so as to separate the housing to permit removal of one or both of the associated assembly devices. It has also been found that the neck portion can be eliminated when and if the production tolerances of the fuel sender assembly are kept to a sufficiently minimal amount so that the respective components can be removed from the installed position when clip 26 is removed and the connector or coupler housing 16 is advanced onto fluid line FL in the downstream direction thereof. In this event, coupler housing 16 can be advanced away from pump tube PT so as to permit horizontal swiveling of the connector housing 16 so as to permit access to pump P.

What has been taught, then, is a coupler for connecting the confronting ends of two fluid lines and which overcomes the disadvantages of the prior art. The form of the invention illustrated and described herein is but a preferred embodiment of these teachings. It is shown as an illustration of the inventive concepts, however, rather than by way of limitation, and it is pointed out that various modifications and alterations may be indulged in within the scope of the appended claims.

What is claimed is:

1. A coupler for sealingly interspacing first and second tubular fluid conduits defining substantially axially fixed confronting open ends with said second conduit further defining a radially outwardly extending circumferential flange, said coupler comprising:

a generally tubular body extending along a longitudinal axis, said body defining a stepped through passage with a relatively small first opening at a first end thereof for receiving said first fluid conduit within said through passage, and a relatively large second opening at a second end thereof for receiving said second fluid conduit within said through passage, said body defining a circumferentially elongated radially extending slot communicating with said through passage axially adjacent said second opening coincident with said circumferential flange of said second conduit;

a clip nestingly received within said slot and extending radially inwardly therethrough to embracingly engage said second conduit about a portion of the circumference thereof at two axially spaced locations straddling said flange to effect a bi-directional axial interlock between said body and said second conduit;

first seal means operative to effect a substantially fluid tight slip fit between said body and said first conduit; and second seal means disposed axially intermediate the open end of said second conduit and said clip operative to effect a substantially fluid tight seal between said body and said second conduit.

2. The coupler according to claim 1 wherein said body includes a frangible neck portion intermediate said openings at the ends of said body for separating said first and second conduits by shearing said body at said neck portion.

3. The coupler according to claim 1 wherein said first seal means comprises an O-ring disposed within a radially inwardly opening annular recess in said body.

4. The coupler according to claim 1, wherein said first conduit has an outer diameter dimension not significantly smaller than an outer diameter dimension of said second conduit and said first and second seal means comprise first and second resilient annular seals, respectively, said second annular seal having a characteristic outer diameter substantially greater than a characteristic outer diameter of said first annular seal.

5. In combination:

a fluid pump;

first and second tubular fluid conduits in circuit with said pump and defining substantially axially fixed confronting open ends with said second conduit further defining a radially outwardly extending circumferential flange; and a coupler for sealingly interspacing said first and second conduits including a generally tubular body extending along a longitudinal axis, said body defining a stepped through passage with a relatively small first opening at a first end thereof for receiving said first fluid conduit within said through passage, and a relatively large second opening at a second end thereof for receiving said second fluid conduit within said through passage, said body defining a circumferentially elongated radially extending slot communicating with said through passage axially adjacent said second opening coincident with said circumferential flange of said second conduit;

a clip nestingly received within said slot and extending radially inwardly therethrough to embracingly engage said second conduit about a portion of the circumference thereof at two axially spaced locations straddling said flange to effect a bi-directional axial interlock between said body and said second conduit;

first seal means operative to effect a substantially fluid tight slip fit between said body and said first conduit; and second seal means disposed axially intermediate the open end of said second conduit and said clip operative to effect a substantially fluid tight seal between said body and said second conduit.

6. The combination according to claim 5 wherein said body includes a frangible neck portion located intermediate said openings at the ends of said body for separating said conduits by shearing said body at said neck portion.

7. The combination according to claim 5 wherein said first seal means comprises an O-ring provided in a radially inwardly facing annular recess in said body.

8. The coupler according to claim 6 wherein said body is stepped along its longitudinal axis into two portions of differing radial dimension and wherein said neck portion is provided in the step portion of lesser radial dimension.

9. The coupler according to claim 8, wherein the cross-sectional configuration of said body is hexagonal along both stepped portions.

10. A method for connecting substantially axially fixed confronting ends of first and second tubular fluid lines, said method comprising the steps of:

providing a coupler housing having a generally tubular body extending along a longitudinal axis, said body having a stepped through passage with a relatively small first opening at a first end thereof for receiving said first tube in said body and having a relatively large second opening at a second end there for receiving said second tube in said body;

sealingly engaging an end portion of said first tube to effect a substantially fluid tight slip fit within said body;

sealingly engaging an end portion of said second tube within said body; and nestingly inserting a clip extending radially inwardly within a circumferentially elongated radially extending slot in said body for engaging a radially outwardly extending circumferential flange formed on said second tube to embracingly engage said second tube about a portion of the circumference thereof at two axially spaced locations straddling said flange to retain said second tube within said body and to thereby limit the longitudinal movement of said first tube into and out of said body.

11. The method according to claim 10 including the step of providing a frangible neck portion intermediate said openings at the ends of said body for separating said first and second tubes by shearing said body at said neck portion.

12. The method according to claim 10 wherein said step of sealingly engaging said first tube includes the step of providing an O-ring in a radially inwardly opening annular recess in said body.

13. A coupler for sealingly interspacing first and second tubular fluid conduits defining substantially axially fixed confronting open ends, said second conduit further defining an engagement surface on an external surface thereof, said coupler comprising:

a generally tubular body extending along a longitudinal axis, said body defining a through passage with a first opening at a first end thereof for receiving said first fluid conduit in a sealing axial slip fit within said through passage, and a second opening at a second end thereof for axially spaced, non-contacting receipt of said second fluid conduit within said through passage, said through passage having an inside diameter dimension that substantially exceeds a characteristic outside diameter of said second fluid conduit, said body defining a radially extending slot communicating with said through passage in axial register with said engagement surface;

a clip nestingly disposed within said slot and extending radially inwardly to abut the engagement surface of said second fluid conduit to effect a positive bi-directional axial interlock between said body and said second conduit; and resilient seal means disposed axially intermediate the open end of said second conduit and said clip operative to effect a substantially fluid tight seal between said body and said second circuit.

* * * * *